United States Patent
Yoshikawa et al.

(10) Patent No.: US 11,336,829 B2
(45) Date of Patent: May 17, 2022

(54) DISPLAY CONTROL APPARATUS CAPABLE OF PERFORMING DISPLAY CONTROL FOR DISPLAY APPARATUS WITH VARIABLE ORIENTATION, CONTROL METHOD THEREFOR, AND STORAGE MEDIUM

(71) Applicant: CANON KABUSHIKI KAISHA, Tokyo (JP)

(72) Inventors: Akio Yoshikawa, Kanagawa (JP); Takashi Seki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/164,049

(22) Filed: Feb. 1, 2021

(65) Prior Publication Data

US 2021/0243381 A1    Aug. 5, 2021

(30) Foreign Application Priority Data

Feb. 3, 2020   (JP) .............................. JP2020-016495

(51) Int. Cl.
*H04N 5/232*    (2006.01)
*H04N 5/262*    (2006.01)

(52) U.S. Cl.
CPC .  *H04N 5/232939* (2018.08); *H04N 5/232933* (2018.08); *H04N 5/2628* (2013.01); *H04N 5/23245* (2013.01)

(58) Field of Classification Search
CPC ....... H04N 5/232939; H04N 5/232933; H04N 5/2628; H04N 5/23245
See application file for complete search history.

(56) References Cited

U.S. PATENT DOCUMENTS

| | | | | |
|---|---|---|---|---|
| 8,035,720 | B2 * | 10/2011 | Ozone | H04N 21/440272 348/333.12 |
| 2006/0204232 | A1 * | 9/2006 | Weinberg | G03B 17/02 396/50 |
| 2012/0176508 | A1 * | 7/2012 | Jeong | H04N 5/22525 348/231.2 |
| 2016/0227105 | A1 * | 8/2016 | Kobayashi | G06F 3/04847 |
| 2017/0104900 | A1 * | 4/2017 | Kitaya | G06T 7/11 |
| 2019/0098190 | A1 * | 3/2019 | Hosoe | H04N 5/225251 |

FOREIGN PATENT DOCUMENTS

JP     2016-225766 A     12/2016

\* cited by examiner

*Primary Examiner* — Timothy J Henn
(74) *Attorney, Agent, or Firm* — Cowan, Liebowitz & Latman, P.C.

(57) ABSTRACT

A display control apparatus includes an obtainment unit capable of obtaining a captured image, and a control unit that performs control to display the captured image on a display device, wherein the control unit performs control to, when the orientation of the display device is horizontal, display the captured image in a first size on the display device, display a first item in a first region located along a first side of the display device, and display a second item in a second region located along a second side of the display device, and when the orientation of the display device is vertical, display the captured image in the first size on the display device, and display the first item and the second item nearer than when the orientation of the display device is horizontal.

23 Claims, 6 Drawing Sheets

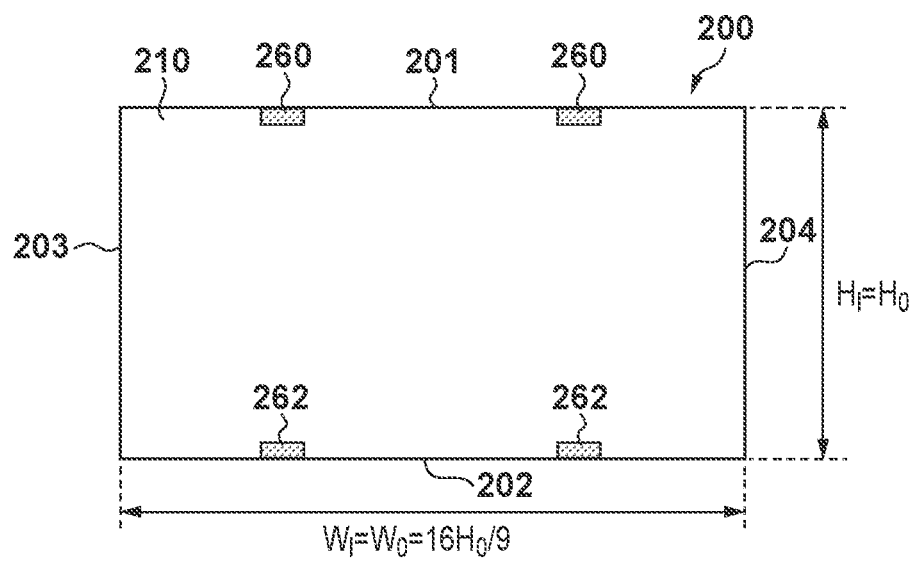
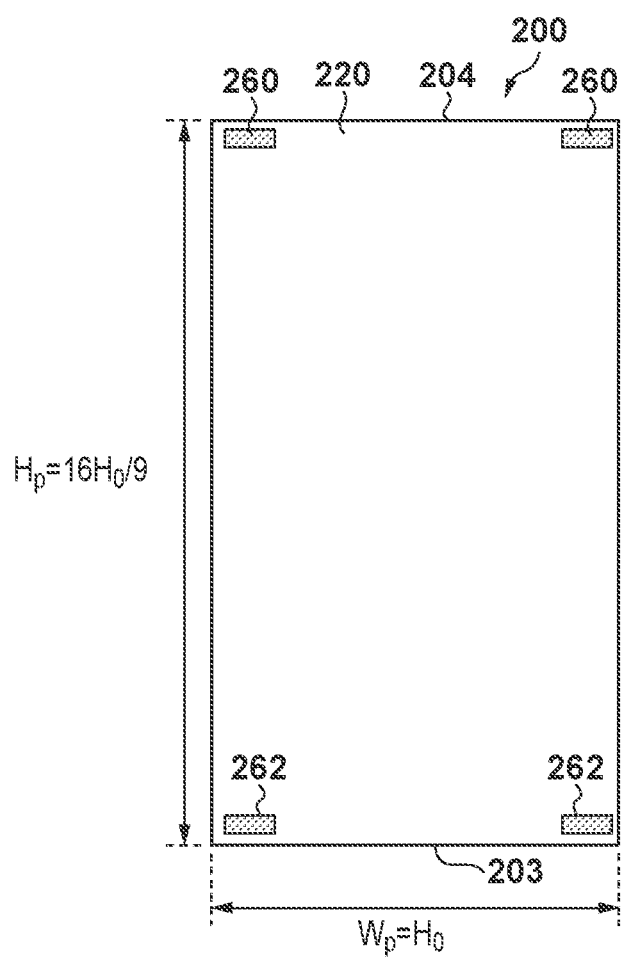
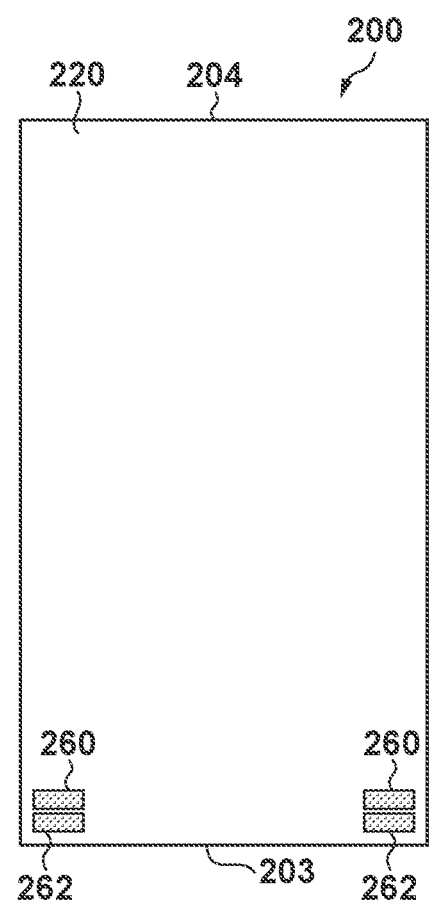

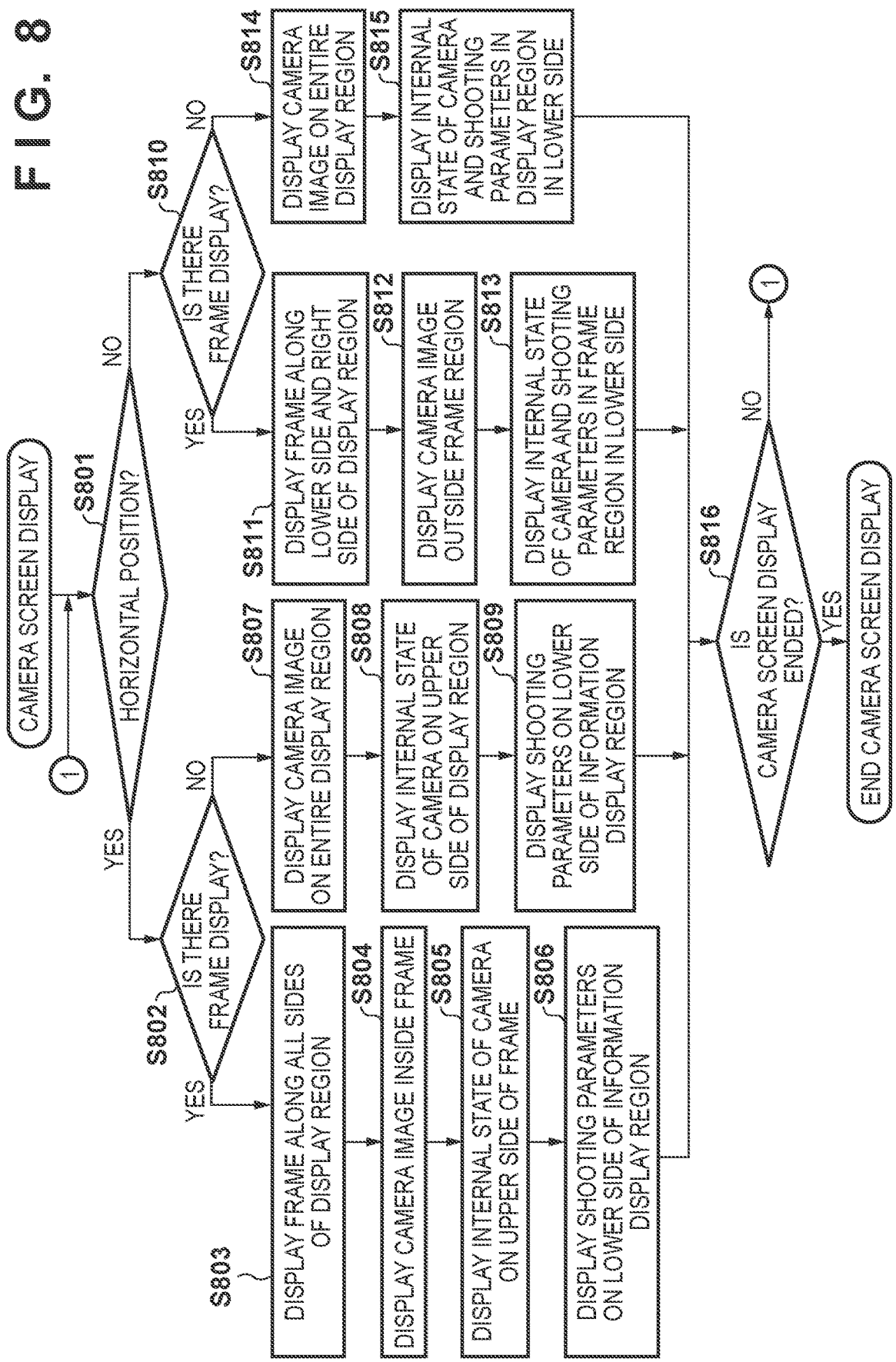

DISPLAY CONTROL APPARATUS CAPABLE OF PERFORMING DISPLAY CONTROL FOR DISPLAY APPARATUS WITH VARIABLE ORIENTATION, CONTROL METHOD THEREFOR, AND STORAGE MEDIUM

BACKGROUND OF THE INVENTION

Field of the Invention

The present invention relates to a display control apparatus, and especially relates to a display technique for a case where the orientation of a display apparatus has changed.

Description of the Related Art

There are techniques to display information together with images. Japanese Patent Laid-Open No. 2016-225766 discloses that a plurality of regions for information display, which are different from a region in which an image is displayed, are moved to an end of a display screen in response to a user instruction, and information is displayed in an enlarged region.

The distance between an upper side and a lower side of a display screen differs between when the orientation of the screen is vertical and when the orientation of the screen is horizontal. As in Japanese Patent Laid-Open No. 2016-225766, if information display regions are collected, the display position of an image is displaced from the center. On the other hand, if information display regions are not collected, the distance of the line of sight created by eye movement between the upper side and the lower side increases when the display screen is oriented vertically.

SUMMARY OF THE INVENTION

The present invention has been made in view of the foregoing problem, and provides a display control apparatus that does not lower visibility whether the orientation of a display screen is vertical or horizontal.

According to a first aspect of the present invention, there is provided a display control apparatus comprising: at least one processor or circuit configured to function as: an obtainment unit capable of obtaining a captured image, and a control unit that performs control to display the captured image on a display device, wherein the control unit performs control to, when the orientation of the display device is horizontal, display the captured image in a first size on the display device, display a first item in a first region located along a first side of the display device, and display a second item in a second region located along a second side of the display device, and when the orientation of the display device is vertical, display the captured image in the first size on the display device, and display the first item and the second item nearer than when the orientation of the display device is horizontal.

According to a second aspect of the present invention, there is provided a display control apparatus comprising: at least one processor or circuit configured to function as: an obtainment unit capable of obtaining a captured image, and a control unit that performs control to display the captured image on a display device, wherein the control unit performs control to, when the orientation of the display device is horizontal, display a first item and a second item in a region surrounding the captured image, in such a manner that the captured image is placed between the first item and the second item, and when the orientation of the display device is vertical, display the first item and the second item in a region which does not surround the captured image and which is different from the captured image, in such a manner that the first item and the second item neighbor each other.

According to a third aspect of the present invention, there is provided a method of controlling a display control apparatus comprising: obtaining a captured image; controlling the captured image to be displayed on a display device; and detecting an orientation of the display device, wherein in the controlling, control is performed to, when the orientation of the display device detected in the detecting is horizontal, display the captured image in a first size on the display device, further display a first item in a first region located along a first side of the display device, and display a second item in a second region located along a second side of the display device, and when the orientation of the display device is vertical, display the captured image in the first size on the display device, and further display the first item and the second item in the same region.

According to a fourth aspect of the present invention, there is provided a method of controlling a display control apparatus comprising: obtaining a captured image; controlling the captured image to be displayed on a display device; and detecting an orientation of the display device, wherein in the controlling, control is performed to, when the orientation of the display device detected in the detecting is horizontal, display a first item and a second item in a region surrounding the captured image, in such a manner that the captured image is placed between the first item and the second item, and when the orientation of the display device detected in the detecting is vertical, display the first item and the second item in a region which does not surround the captured image and which is different from the captured image, in such a manner that the first item and the second item neighbor each other.

Further features of the present invention will become apparent from the following description of exemplary embodiments with reference to the attached drawings.

BRIEF DESCRIPTION OF THE DRAWINGS

FIGS. 2A to 2C are diagrams for describing a display method in the first embodiment.

FIG. 8 is a flowchart showing display operations of a display unit.

DESCRIPTION OF THE EMBODIMENTS

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

First Embodiment

<Configuration of Digital Video>

Figure 1:
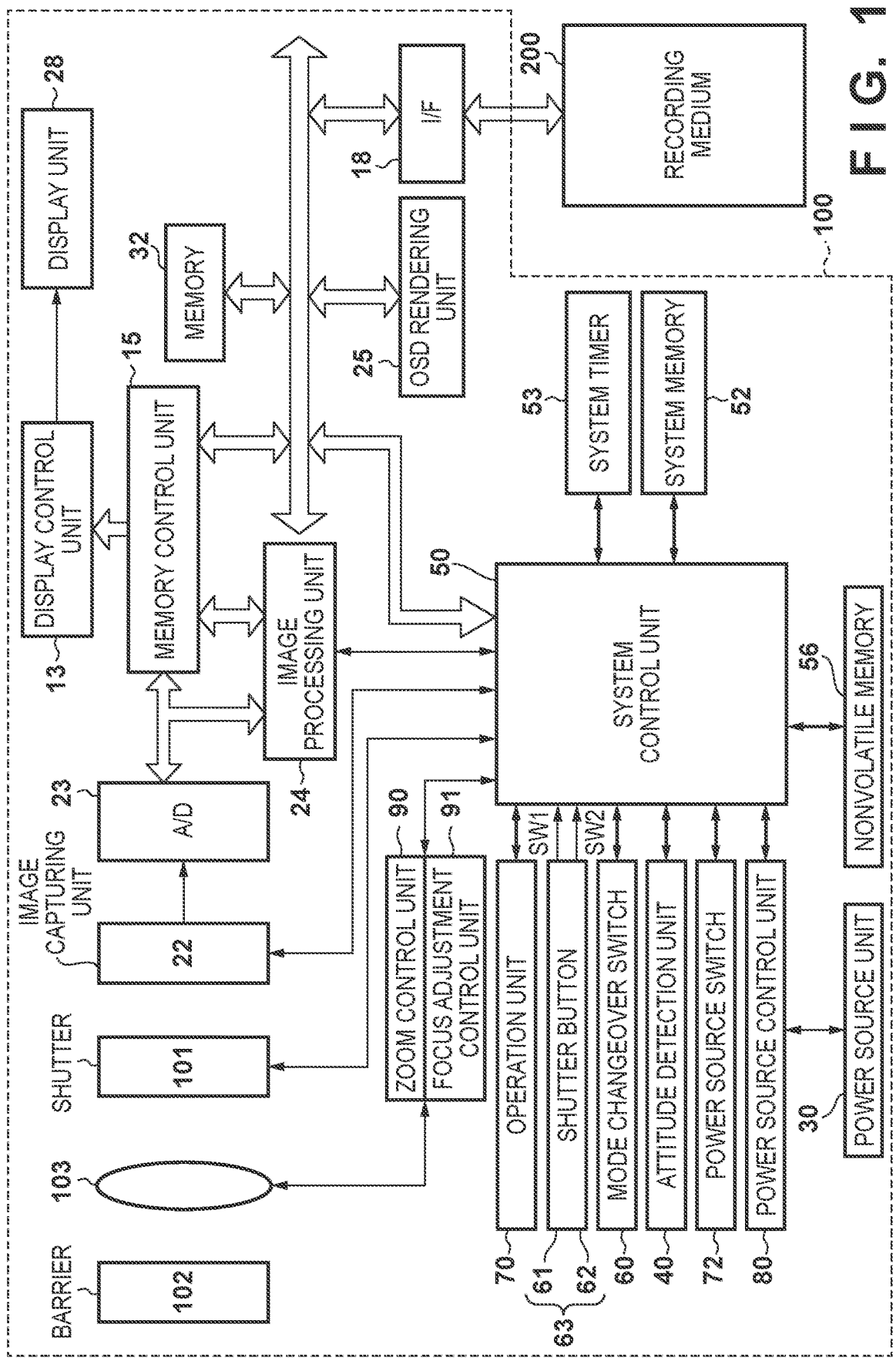
FIG. 1 is a block diagram showing a configuration example of a digital video camera pertaining to a first embodiment of the present invention.

FIG. 1 is a block diagram showing a configuration example of a digital video camera 100 pertaining to a first embodiment of the present invention.

In FIG. 1, a photographing lens 103 is a lens assembly including a zoom lens and a focus lens. The zoom lens is a lens for changing a zoom magnification by changing a focal length, and is controlled by a zoom control unit 90. The focus lens is a lens for achieving focus, and is controlled by a focus adjustment control unit 91. A shutter 101 is a shutter that has a diaphragm function. An image capturing unit 22 includes an image sensor composed of, for example, a CCD or CMOS element that converts an optical image into electrical signals. An A/D converter 23 converts analog signals (captured image signals) that are obtained by and output from the image capturing unit 22, which is capable of obtaining captured images, into digital signals. A barrier 102 covers an image capturing system of the digital video camera 100, including the photographing lens 103, so as to prevent the image capturing system, including the photographing lens 103, the shutter 101, and the image capturing unit 22, from being soiled or damaged.

An image processing unit 24 performs predetermined pixel interpolation, resizing processing including reduction, and color conversion processing with respect to data from the A/D converter 23 or data from a memory control unit 15. The image processing unit 24 also performs predetermined computational processing with use of captured image data, and a system control unit 50 performs exposure control and focus adjustment control based on the obtained computation result. As a result, AF (autofocus) processing, AE (automatic exposure) processing, and EF (preliminary flash emission) processing are performed using a TTL (through-the-lens) method. Furthermore, the image processing unit 24 performs predetermined computational processing with use of captured image data, and also performs AWB (auto white balance) processing using the TTL method based on the obtained computation result.

Output data from the A/D converter 23 is written directly into a memory 32 via the image processing unit 24 and the memory control unit 15, or via the memory control unit 15. The memory 32 stores image data that has been obtained by the image capturing unit 22 and converted into digital data by the A/D converter 23, and image data to be displayed on a display unit 28. The memory 32 has a storage capacity sufficient to store a predetermined number of still images, as well as moving images and audio of a predetermined duration.

Under an instruction from the system control unit 50, an OSD rendering unit 25 renders an image for on-screen display into a graphics VRAM secured inside the memory 32. Font data and icon data stored in a nonvolatile memory 56 are used to construct a menu screen for configuring various types of settings of the digital video camera 100, an information display screen for displaying the operation statuses of respective components of the digital video camera 100, and a guidance display screen that is used by a user to appropriately operate an operation unit 70 and the like, and the constructed screens are rendered into the graphics VRAM.

The memory 32 also functions as a memory for image display (video memory). A display control unit 13 composites together data for image display stored in the memory 32 and data in the graphics VRAM by way of superimposition, converts the resultant data into digital video signals, and supplies the digital video signals to the display unit 28. The display unit 28 causes a display device, such as an LCD, to perform display in accordance with the digital video signals from the display control unit 13. As a result of performing the foregoing processing sequence in succession, the display unit 28 can function as an electronic viewfinder with an information display function and display through-the-lens images. Furthermore, in the present embodiment, the display unit 28 is, for example, a liquid crystal display. Alternatively, a display based on another method, such as an organic EL (Organic Electroluminescence) display, may be used. The display unit 28 may be configured integrally with a housing of the digital video camera 100, or may be configured to, as an entity different from the digital video camera 100, receive and display digital video signals that have been transmitted from the digital video camera 100 via a cable or wireless communication.

The nonvolatile memory 56 is an electrically erasable and recordable memory. For example, constants and a program for the operations of the system control unit 50 are stored in the nonvolatile memory 56. The program mentioned here denotes a program for executing various types of flowcharts, will be described later in the present embodiment.

The system control unit 50 controls an entirety of the digital video camera 100. Each processing of the present embodiment, which will be described later, is realized by executing the aforementioned program stored in the nonvolatile memory 56. 52 is a system memory, and a RAM is used thereas. Constants and variables for the operations of the system control unit 50, the program that has been read out from the nonvolatile memory 56, and the like are deployed to the system memory 52. Furthermore, the system control unit 50 also performs display control by controlling the memory 32, the display control unit 13, the display unit 28, and the like.

A system timer 53 is a time measurement unit that measures the times used in various types of control and the time of an internal clock.

A mode changeover switch 60, a first shutter switch 61, a second shutter switch 62, and the operation unit 70 are operation means for inputting various types of operational instructions to the system control unit 50. For example, performing an operation of selecting various types of function icons displayed on the display unit 28 will assign functions, as appropriate, to respective operation members of the operation unit 70 on a scene-by-scene basis; as a result, respective operation members act as various types of function buttons. Examples of the function buttons include an end button, a return button, a next image button, a jump button, a sort button, an attribute change button, and so on. For example, pressing a menu button will display, on the display unit 28, a menu screen on which various types of settings can be configured. The user can intuitively configure various types of settings by using the menu screen displayed on the display unit 28, four-direction buttons corresponding to up, down, left, and right, and a SET button.

The mode changeover switch 60 changes an operation mode of the system control unit 50 to one of a still image recording mode, a moving image recording mode, a reproduction mode, and so forth. Examples of modes included in the still image recording mode include an auto shooting mode, an auto scene distinction mode, a manual mode, various types of scene modes in which shooting settings are configured on a scene-by-scene basis, a program AE mode, a diaphragm priority AE mode (hereinafter AV mode), a shutter speed priority AE mode (hereinafter TV mode), a custom mode, and a manual mode (hereinafter M mode). The mode changeover switch 60 is used to switch directly to one of these modes included in the still image shooting mode. Alternatively, after switching to the still image shooting mode with use of the mode changeover switch 60, another operation member may be used to switch to one of these modes included in the still image shooting mode. Similarly, the moving image shooting mode may also include a plurality of modes.

The first shutter switch 61 is turned ON and generates a first shutter switch signal SW1 partway through an operation performed on a shutter button 63 mounted on the digital video camera 100, that is to say, when the shutter button 63 is depressed halfway (a shooting preparation instruction). The first shutter switch signal SW1 causes the operations of AF (autofocus) processing, AE (automatic exposure) processing, AWB (auto white balance) processing, EF (preliminary flash emission) processing, and the like to be started.

The second shutter switch 62 is turned ON and generates a second shutter switch signal SW2 upon completion of the operation performed on the shutter button 63, that is to say, when the shutter button 63 is fully depressed (a shooting instruction). The second shutter switch signal SW2 causes the system control unit 50 to start the operations of a shooting processing sequence, from reading out signals from the image capturing unit 22 to writing image data into a recording medium 200.

A power source switch 72 is a switch for switching between ON and OFF of a power source for the entirety of the digital video camera 100.

A power source control unit 80 is composed of, for example, a battery detection circuit, a DC-DC converter, and a switch circuit for switching among the blocks to which current is supplied, and detects whether a battery is loaded, a battery type, and a remaining battery power. The power source control unit 80 also controls the DC-DC converter based on the results of the foregoing detection and an instruction from the system control unit 50, and supplies a necessary voltage for a necessary period to respective components, including the recording medium 200.

A power source unit 30 is composed of, for example, a primary battery (e.g., an alkaline battery and a lithium battery), a secondary battery (e.g., a NiCd battery, a NiMH battery, and a lithium-ion battery), or an AC adapter. A recording medium I/F 18 is an interface with the recording medium 200, which is a memory card, a hard disk, or the like. The recording medium 200 is a memory card or a similar recording medium for recording shot images, and is composed of a semiconductor memory, a magnetic disk, or the like.

An attitude detection unit 40 is a detection unit that detects (is capable of detecting) the attitude of the display unit 28, and is composed of, for example, a gyroscope and a panel rotation detection sensor that is attached to a panel rotation driving unit.

<Superimposed Display Mode>

FIGS. 2A to 2C are diagrams for describing a display method in the first embodiment. First, a superimposed display mode will be described using FIG. 2A, FIG. 2B, and FIG. 2C.

FIG. 2A shows an image that is displayed on a display panel 200, which is disposed on the display unit 28, in the combination of a horizontal-shooting display mode (horizontal orientation mode) and the superimposed display mode. First display items 260 as first items, and second display items 262 as second items, are displayed while being superimposed on a live-view image 210. The vertical-horizontal ratio (vertical horizontal) of the display panel 200 is smaller than 1, for example, 9/16. The display panel 200 has a long side 201 (upper side) as a first side, a long side 202 (lower side) as a second side, a short side 203 as a third side, and a short side 204 as a fourth side. The long side 201 and the long side 202 have a length of $(16/9) \cdot H_0$, and the short side 203 and the short side 204 have a length of $H_0$. The live-view image 210 has a size of $(16/9) \cdot H_{02}$.

The first display items 260 are arranged along the long side 201, or in the vicinity of the long side 201. The second display items 262 are arranged along the long side 202, or in the vicinity of the long side 202. Furthermore, the first display items 260 and the second display items 262 are arranged in the vicinity of an outer periphery of the live-view image 210 so as not to impair the visibility of the live-view image in the combination of the horizontal-shooting display mode and the superimposed display mode.

Here, the first display items 260 may be or may not be in contact with a side of a region of a displayable range of the display panel 200 when displayed. For example, the first display items 260 may be displayed in a state where they are slightly located away from a side of the region of the displayable range. For example, the first display items 260 may be arranged in a region that is located at or within $(1/10) \cdot H_0$ of the long side 201.

For example, the advantageous effects of the present embodiment are not impaired as long as the first display items 260 and the second display items 262 are located so as not to impair the visibility of the live-view image in the combination of the horizontal-shooting display mode and the superimposed display mode. Display positions may be determined in accordance with, for example the resolution and the size of the display panel 200.

FIG. 2B and FIG. 2C show an image that is displayed on the display panel 200 in the combination of a vertical-shooting display mode (vertical orientation mode) and the superimposed display mode, for the purpose of describing the advantageous effects of the present embodiment. FIG. 2B shows an example in which items are displayed along both of an upper side and a lower side in the vertical shooting mode, and FIG. 2C shows an example in which items are displayed along one of an upper side and a lower side in the vertical shooting mode. A live-view image 220 has the same size as the live-view image 210, that is to say, a size of $(16/9) \cdot H_{02}$.

In FIG. 2B, arranges the first display items 260 in the vicinity of the short side 204 in accordance with the rotation of the display panel 200, so as to not impair the visibility of the live-view image 220 and the first display items 260 in the vertical shooting mode, the display control unit 13. At this time, the display control unit 13 performs control so that information of the first display items 260 is displayed along the direction that is easy to view for a photographer, that is to say, so that this direction is parallel to the short side 204. Similarly, the display control unit 13 also arranges the second display items 262 in the vicinity of the short side 203. In these display modes, the distance between the first display items 260 and the second display items 262 is $(16/9) \cdot H_0$. On the other hand, the distance between the first display items 260 and the second display items 262 in the combination of the horizontal-shooting display mode and the superimposed display mode, which is shown in FIG. 2A, is $H_0$. That is to say, in the format shown in FIG. 2B, the eye movement along the line of sight increases by $(7/9) \cdot H_0$ compared to the display modes shown in FIG. 2A.

In general, when the movement of human eyes along the line of sight increases in the vertical direction, this increase becomes a burden, and thus there is a possibility that the visibility of the first display items 260 and the second display items 262 decreases compared to the horizontal display mode.

FIG. 2C is a diagram showing a case where the display control unit 13 performs control so that the first display items 260 and the second display items 262 are displayed in the same region on one side of the image, which is the region located along the short side 203 (in a lower section or an upper section). In the format shown in FIG. 2C, as the distance between the first display items 260 and the second display items 262 can be regarded as substantially 0, the eye movement along the line of sight for checking the first display items 260 and the second display items 262 can be reduced compared to FIG. 2B. While the foregoing has described a case where the first display items 260 and the second display items 262 adjoin each other, they may be displayed while being aligned in the horizontal direction, and the first display items 260 may be displayed horizontally next to each other; their layout is not limited to these. It is sufficient that the first display items 260 and the second display items 262 be displayed along the same side. In other words, the display control unit 13 controls the display positions of the first display item 260 and the second display item 262 such that the distance between the first display item 260 and the second display item 262 in the vertical shooting display mode is shorter than the distance between the first display item 260 and the second display item 262 in the horizontal shooting display mode.

<Frame Display Mode>

Next, a frame display mode will be described using FIG. 3A to FIG. 3D.

Figure 3A:
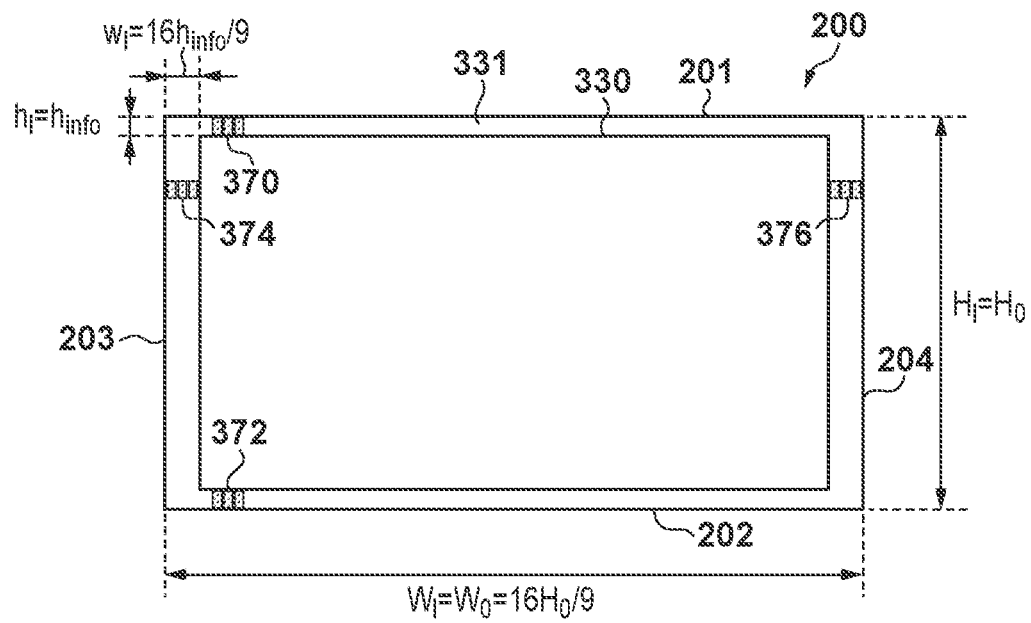
FIGS. 3A to 3D are diagrams for describing a display method in the first embodiment.

FIG. 3A is a diagram showing an image that is displayed on the display panel 200 in the combination of the horizontal-shooting display mode and the frame display mode. The display control unit 13 performs control so that a frame information region 331 is displayed as a region that surrounds a live-view image 330, in the frame information region 331, items that are displayed along a long side direction take up $h_{info}$ in height. Items that are displayed along a short side direction take up $(16/9) \cdot h_{info}$ in width. The display control unit 13 performs control so that third display items 370, fourth display items 372, fifth display items 374, and sixth display items 376 are displayed in the frame information region 331. In these display modes, the live-view image 330 and various types of display items are not superimposed; this makes it easy for the photographer to read displayed information itself compared to the case of FIG. 2A.

It is preferable that $h_{info}$ match a character height with which the characters of respective display items displayed in the frame information region 331 are easy to view for the photographer. Furthermore, it is preferable that $h_{info}$ be a character height that is small to the extent that the visibility of the live-view image 330 is not impaired by a decrease in the image size of the live-view image 330.

In the examples of respective pieces of display item information shown in FIG. 3A to FIG. 3D, a unit of display (e.g., one halfwidth character) has a width of $h_{info}/2$. In FIG. 3A, each set of the third display items 370, the fourth display items 372, the fifth display items 374, and the sixth display items 376 represents three units of information.

Figures 3B, 3C, 3D:
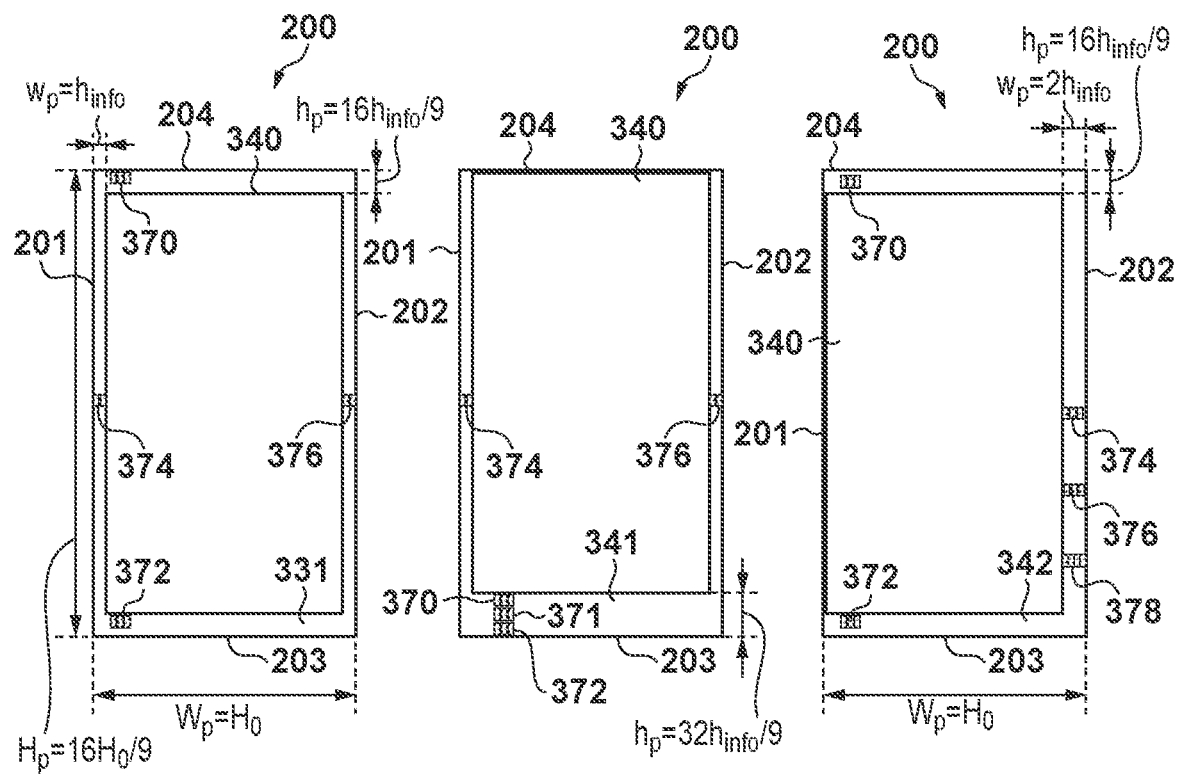

FIG. 3B and FIG. 3C show an image that is displayed on the display panel 200 in the combination of the vertical-shooting display mode and the frame display mode, for the purpose of describing the advantageous effects of the present embodiment. FIG. 3B shows an example in which frame display that is similar to FIG. 3A is performed also when the display panel 200 is vertical, and FIG. 3C shows an example in which the display items are collected in one region.

In FIG. 3B, the display control unit 13 arranges the third display items 370 in the vicinity of the short side 204 in accordance with the rotation of the display panel 200, so as to not impair the visibility of a live-view image 340 and the third display items 370. At this time, the display control unit 13 performs control so that information of the third display items 370 is displayed along the direction that is easy to view for the photographer, that is to say, so that this direction is parallel to the short side 204. Similarly, the display control unit 13 also arranges the fourth display items 372, the fifth display items 374, and the sixth display items 376 in the vicinity of the short side 203, the long side 201, and the long side 202, respectively.

In these display modes, the distance between the third display items 370 and the fourth display items 372 is $(16/9) \cdot H_0$. On the other hand, the distance between the third display items 370 and the fourth display items 372 in the combination of the horizontal-shooting display mode and the frame display mode, which is shown in FIG. 3A, is $H_0$. That is to say, there is a possibility that the visibility of the third display items 370 and the fourth display items 372 decreases compared to the horizontal display mode, similarly to the description of FIG. 2B and FIG. 2C.

Furthermore, the height of the regions in which the third display items 370 and the fourth display items 372 are displayed is $(16/9) \cdot h_{info}$; with this height, the display control unit 13 cannot perform control to display the display items over two rows. Therefore, the display format shown in FIG. 2C cannot be applied as is.

In addition, the width of the regions in which the fifth display items 374 and the sixth display items 376 are displayed is $h_{info}$, which allows only two units of display items to be displayed. Therefore, display control is performed so that the fifth display items 374 and the sixth display items 376 are reduced or wrapped when displayed; in this case, there is a possibility that the visibility of the display items decreases compared to the case of FIG. 3A.

FIG. 3C is a diagram showing a case where the display control unit 13 performs control so as to decenter (shift) the live-view image 340 in a direction parallel to the long sides, and display the third display items 370 and the fourth display items 372 in the same region located along the short side 203. At this time, the display control unit 13 performs control so as to remove the region between an upper side of the live-view image 340 and the short side 204, and bring the short side 204 and the live-view image 340 into contact with each other. As a result of this control, the height of the region located along the short side 203 within a frame information region 341 becomes $(32/9) \cdot h_{info}$, which allows display items to be displayed over three rows. That is to say, as a collective region for displaying display items can be secured, display items 371 can also be newly displayed together with the items 370 and 372. Therefore, the display amount displayable display items increases, which brings about an advantageous effect whereby the amount of information increases.

In the format shown in FIG. 3C, the distance between the third display items 370 and the fourth display items 372 can be regarded as substantially 0. That is to say, it is possible to achieve an advantageous effect whereby the eye movement along the line of sight for checking the third display items 370 and the fourth display items 372 can be reduced compared to the case of FIG. 3B. Although the foregoing has described an exemplary case where the third display items 370 and the fourth display items 372 adjoin each other, the present invention is not limited to this. For example, display items may be displayed while being aligned horizontally, and may be displayed in the vicinity of the center of the frame information region 341 in the vertical direction. The layout of display items is not limited to FIG. 3C. In other words, the display control unit 13 controls the display positions of the third display item 370 and the fourth display item 372 such that the distance between the third display item 370 and the fourth display item 372 in the vertical shooting display mode is shorter than the distance between the third display item 370 and the fourth display item 372 in the horizontal shooting display mode.

Although the foregoing has described a format in which an upper side of the live-view image 340 is not surrounded by the frame information region 341, no limitation is intended by this. For example, it is sufficient for the distance between the short side 204 and the live view 340 to be equal to or shorter than $(5/9) \cdot h_{info}$.

FIG. 3D is a diagram showing a case where the display control unit 13 performs control so as to decenter (shift) the live-view image 340 in a direction parallel to the short sides, and display the fifth display items 374 and the sixth display items 376 in the same region on one side of the image, which is the region located along the long side 202 (in a right section or a left section). The display control unit 13 controls the display positions of the fifth display item 374 and the sixth display item 376 such that the distance between the fifth display item 374 and the sixth display item 376 in the vertical shooting display mode is shorter than the distance between the fifth display item 374 and the sixth display item 376 in the horizontal shooting display mode. At this time, the display control unit 13 performs control so as to remove the region between a left side of the live-view image 340 and the long side 201, and bring the long side 201 and the live-view image 340 into contact with each other. As a result of this control, the width of the region located along the long side 202 within a frame information region 342 becomes $2h_{info}$, which allows four units of display items to be displayed. The present embodiment has an advantageous effect whereby the display format of the fifth display items 374 and the sixth display items 376 in the frame display mode does not change between the horizontal-shooting display mode and the vertical-shooting display mode. Therefore, even when the orientation of the display panel 200 has changed from horizontal to vertical, display items need not be displayed in a reduced manner or displayed separately over multiple rows. Further, by shortening the distance between the fifth display item 374 and the sixth display item 376, it is possible to reduce the movement of the line of sight for confirming the fifth display item 374 and the sixth display item 376. When the distance between the long side 201 and the live-view image 340 is equal to or shorter than $(1/2) \cdot h_{info}$, display items can be displayed in the same display format as when the orientation of the display panel 200 is horizontal. Furthermore, when the long side 201 and the live-view image 340 are in contact with each other, the number of displayed display items increases by one unit.

Although the foregoing has described examples in which the live-view image is decentered in a long side direction and a short side direction as shown in FIG. 3C and FIG. 3D, they may be combined so that the live-view image is decentered in a diagonal direction. In this way, a vertically long region and a horizontally long region are created; in the vertically long region, display can be performed without lowering the visibility of display items, whereas in the horizontally long region, a larger number of display items can be collectively displayed. At this time, as the live-view image is displayed at a position that is displaced from the center of the display panel 200, there is a possibility that the user has difficulty acknowledging the center and the composition of the image. However, during frame display, if the display format of display items remains the same as the case of horizontal orientation, that is to say, if display items are displayed superimposed on the live-view image, the visibility of the live-view image decreases. Therefore, display of FIGS. 3C and 3D is beneficial in order to achieve both of the visibility of display items and the visibility of the live-view image at the same time.

Furthermore, while the foregoing has described a case where the area of the live-view image 330 in the horizontal-shooting display mode is equal to the area of the live-view image 340 in the vertical-shooting display mode, the live-view image 340 may be increased to the extent that the visibility of various types of display items does not decrease. In this case, the visibility in the vertical display mode is further improved.

Moreover, in the frame display mode and the superimposed display mode, the number of display items may be the same in the horizontal-shooting display mode and the vertical-shooting display mode. This format has an advantageous effect whereby, when the user has performed a switchover from horizontal shooting to vertical shooting, the content of information required by the user is maintained.

Although the first embodiment has been described using the display panel 200 with an aspect ratio (vertical÷horizontal) of 9/16, the present invention is not limited to this and is applicable to an aspect ratio other than 1. Especially, the smaller the aspect ratio, the larger the advantageous effects of the present invention.

Second Embodiment

Next, the digital video camera pertaining to a second embodiment of the present invention will be described with reference to FIG. 4, FIG. 5. FIGS. 6A and 6B, FIG. 7, and FIG. 8. The block configuration of the digital camera in the present embodiment is similar to that of the first embodiment shown in FIG. 1, and thus the description thereof is omitted.

Figure 4:
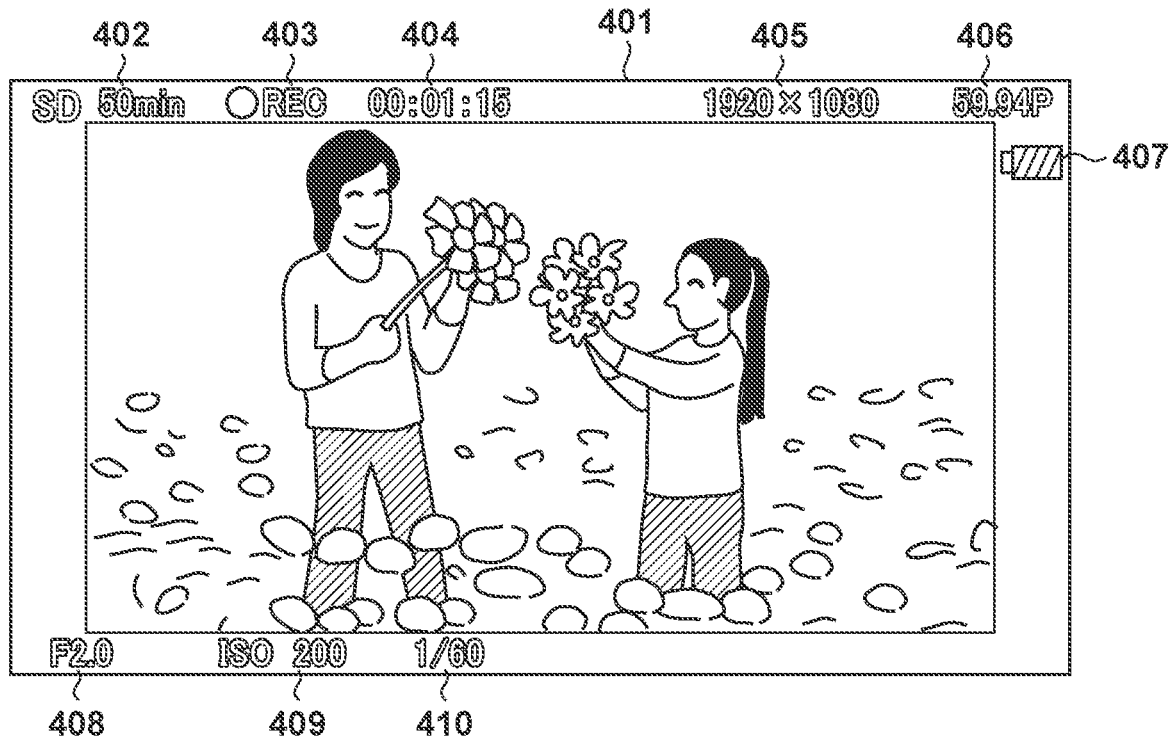
FIG. 4 is a diagram showing an example of display in the combination of a horizontal-shooting display mode and a frame display mode.

FIG. 4 is a diagram showing an example in which the digital video camera 100 displays an image in the combination of the horizontal-shooting display mode and the frame display mode in the present embodiment.

In FIG. 4, 401 denotes a frame information region. The following items are displayed within the frame information region 401. An item 402 is an item that displays a remaining recordable period calculated from a remaining capacity of the memory 32. An item 403 is an item that indicates a current recording state, such as recording in progress and recording not in progress. An item 404 is an item that indicates a period that has elapsed since the recording was started. An item 405 is an item that indicates a recording resolution. An item 406 is an item that indicates a recording frame rate. An item 407 is an item that indicates a remaining period in which the ON state of the power source can be continued, which is calculated from a remaining battery capacity of the power source unit 30. An item 408 is an item that indicates an f-number. An item 409 is an item that indicates a value of an ISO film speed. An item 410 is an item that indicates a shutter speed. The items 408 to 410 are grouped under the concept of shooting parameters. Note that the items described here are examples, and presented information is not limited to these types; other items may be displayed, and the items described as examples may not be displayed.

Figure 5:
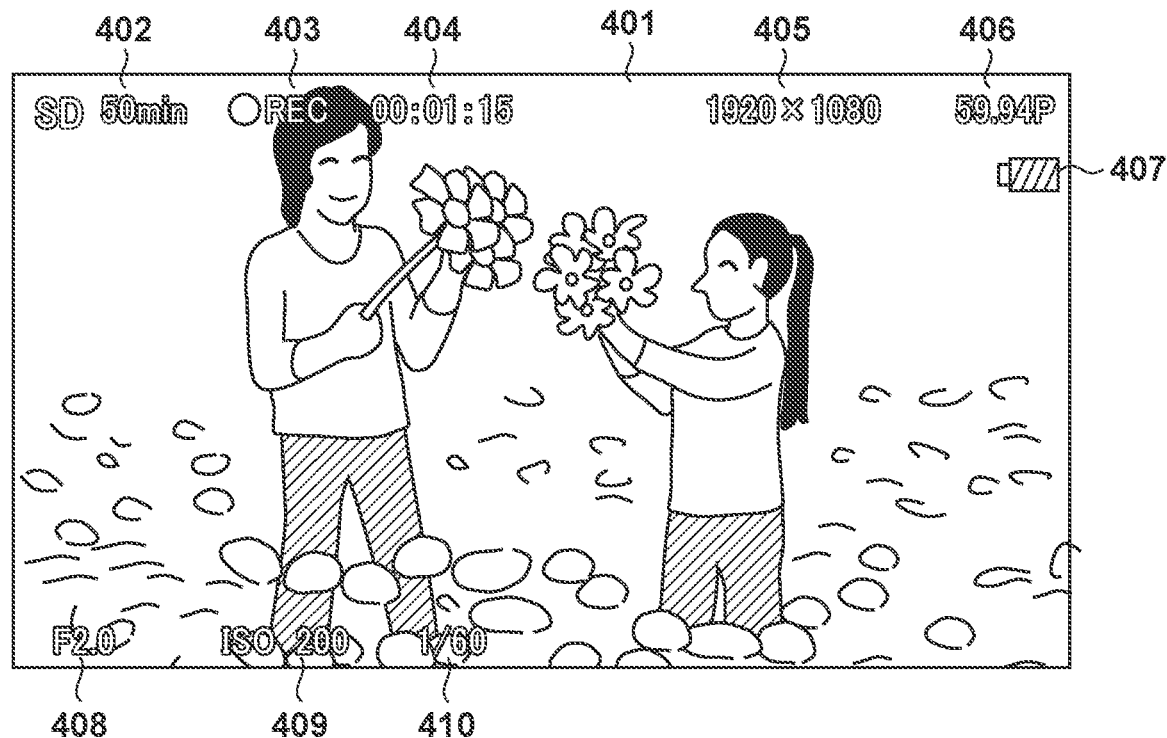
FIG. 5 is a diagram showing an example of display in the combination of the horizontal-shooting display mode and a superimposed display mode.

FIG. 5 is a diagram showing an example in which the digital video camera displays an image in the combination of the horizontal-shooting display mode and the superimposed display mode in the present embodiment.

Figure 6A:
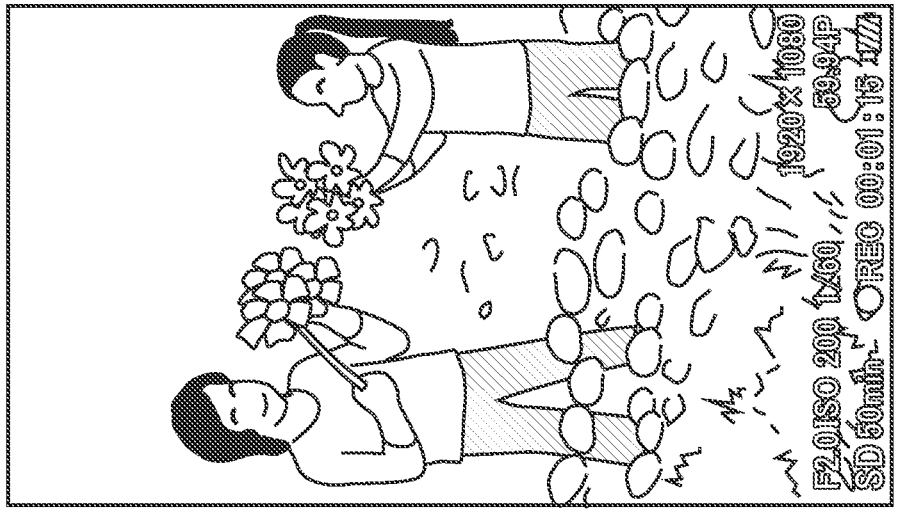
FIGS. 6A and 6B are diagrams showing examples of display in the combination of a vertical-shooting display mode and the frame display mode.
Figure 6B:
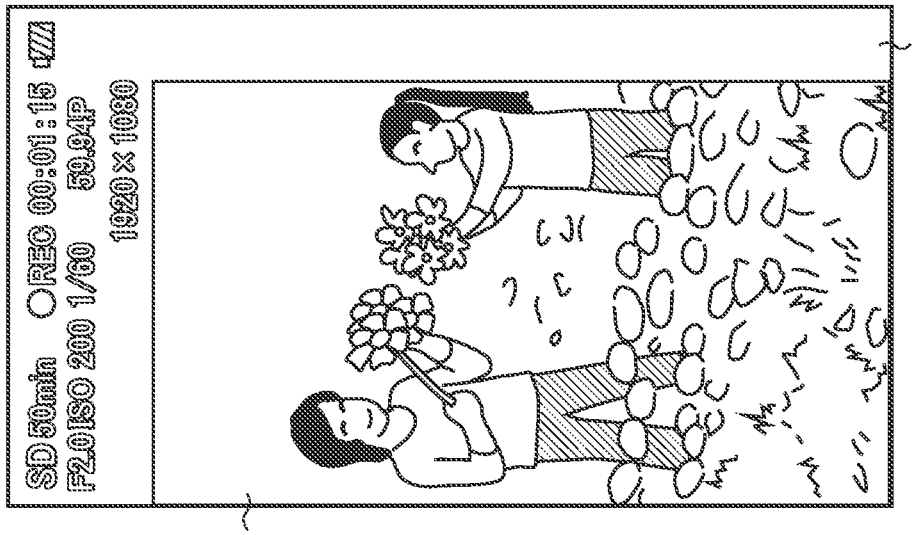

FIGS. 6A and 6B are diagrams showing an example in which the digital video camera displays an image in the combination of the vertical-shooting display mode and the frame display mode in the present embodiment. In FIG. 6A, as a result of moving a live-view image 601 to one side as shown in the figure, a continuous region 610, in which the display items can be displayed, is enlarged. Regarding the display items, it is sufficient that related items, such as shooting parameters, be collectively displayed near one another as in a region 602. The related items are, for example, information related to exposure, information related to time measurement, information related to media, or information which is included in information displayed on the display unit and which can be directly controlled. Furthermore, the direction in which the live-view image 601 is moved may be changed in accordance with a user status as shown in FIG. 6B. For example, when it is determined that inclination information from the attitude detection unit 40 indicates a situation of high-angle shooting, the live-view image may be moved to a lower side. For example, when the attitude detection unit 40 indicates that an inner product of the normal direction and the gravity direction of the display unit 28 is equal to or larger than a predetermined threshold, the live-view image can be moved to a lower side. Furthermore, the operation unit 70 may include a mechanism for switching a display position of the live-view image, and a position which the live-view image is moved may be temporarily changed by a user operation.

Figure 7:
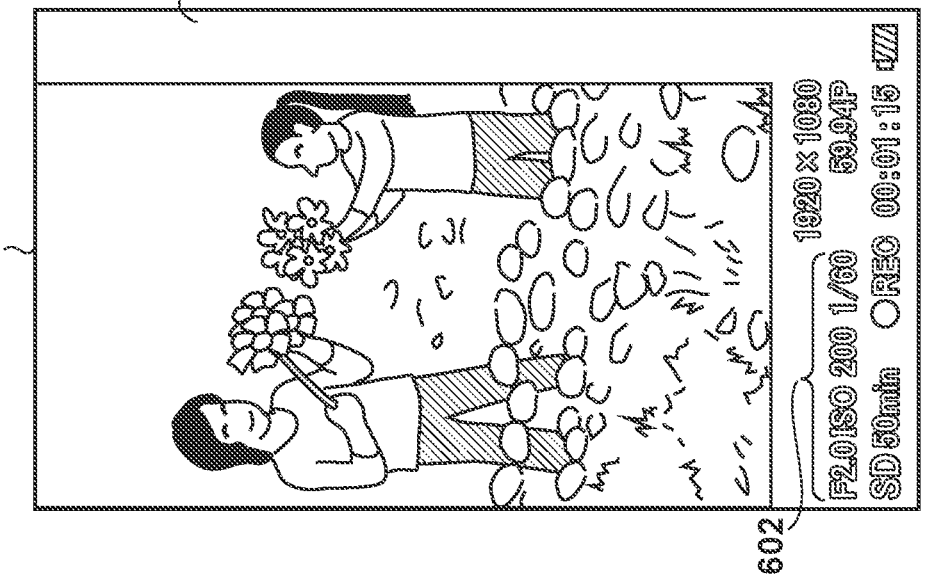
FIG. 7 is a diagram showing an example of display in the combination of the horizontal-shooting display mode and the superimposed display mode.

FIG. 7 is a diagram showing an example in which the digital video camera displays an image in the combination of the vertical-shooting display mode and the superimposed display mode in the present embodiment. This shows a state where the display items are displayed as in FIG. 2C.

FIG. 8 is a flowchart showing an operation of changing a display method of the digital video camera according to the present embodiment.

Note that the processing of FIG. 8 is executed as the program recorded in the nonvolatile memory 56 is deployed to the system memory 52 and executed by the system control unit 50. Also, this processing is started in a state where a power source of the power source unit 30 is ON (the power source is switched ON) and the entire system of the digital video camera 100 has been activated stably.

In step S801, based on information obtained from the attitude detection unit 40, the system control unit 50 determines whether the digital video camera 100 is in a horizontal position. When the system control unit 50 determines that the digital video camera 100 is in the horizontal position, processing proceeds to step S802, and when the system control unit 50 determines otherwise, processing proceeds to step S810.

In step S802, the system control unit 50 determines whether the display control unit 13 is performing frame display control. When the system control unit 50 determines that the frame display control is performed, processing proceeds to step S803, and when the system control unit 50 determines otherwise, processing proceeds to step S807. Note that whether to perform the frame display control can be switched by, for example, the user operating a button included in the operation unit 70.

In step S803, the system control unit 50 performs control to render the frame information region 401 as shown in FIG. 4 with use of the OSD rendering unit 25, and display the rendered frame information region 401 on the display unit 28.

In step S804, the system control unit 50 controls the display unit 28 to display a shot image obtained by the image capturing unit 22 inside the frame information region 401.

In step S805, the system control unit 50 renders items that indicate the internal state of the camera, with use of the OSD rendering unit 25, so that the items are displayed in a region on an upper side of the frame information region 401 as with the items 402 to 407 of FIG. 4, and displays the rendered items on the display unit 28.

In step S806, the system control unit 50 renders items that indicate shooting parameters of the camera, with use of the OSD rendering unit 25, so that the items are displayed in a region on a lower side of the frame information region 401 as with the items 408 to 410 of FIG. 4, and displays the rendered items on the display unit 28.

In step S807, the system control unit 50 performs control so that the shot image obtained by the image capturing unit 22 is displayed on an entirety of the display unit 28.

In step S808, the system control unit 50 renders items that indicate the internal state of the camera, with use of the OSD rendering unit 25, so that the items are displayed in a region on an upper side of the display unit 28 as with the items 402 to 407 of FIG. 5, and displays the rendered items on the display unit 28.

In step S809, the system control unit 50 renders items that indicate shooting parameters of the camera, with use of the OSD rendering unit 25, so that the items are displayed in a region on a lower side of the display unit 28 as with the items 408 to 410 of FIG. 5, and displays the rendered items on the display unit 28.

In step S810, the system control unit 50 determines whether the display control unit 13 is performing the frame display control. When the system control unit 50 determines that the frame display control is performed, processing proceeds to step S811, and when the system control unit 50 determines otherwise, processing proceeds to step S814.

In step S811, the system control unit 50 performs control to render the frame information region 610 as shown in FIG. 6A or 6B with use of the OSD rendering unit 25, and display the rendered frame information region 610 on the display unit 28.

In step S812, the system control unit 50 controls the display unit 28 to display the shot image obtained by the image capturing unit 22 so that the shot image does not overlap the frame information region 610.

In step S813, the system control unit 50 renders shooting parameters of the camera, with use of the OSD rendering unit 25, so that the shooting parameters are displayed near one another in a region on a lower side of a frame as in the region 602 of FIG. 6A, and displays the rendered shooting parameters on the display unit 28. Furthermore, items that indicate the internal state of the camera are also rendered so that the items are displayed in the frame information region 610, and the rendered items are displayed.

In step S814, the system control unit 50 performs control so that the shot image obtained by the image capturing unit 22 is displayed on the entirety of the display unit 28.

In step S815, the system control unit 50 renders items that indicate the internal state of the camera and items that indicate shooting parameters of the camera, with use of the OSD rendering unit 25, so that the items are displayed in a region on a lower side of the display unit 28 as shown in FIG. 7, and displays the rendered items on the display unit 28.

In step S816, the system control unit 50 determines whether the user has performed an ending operation with respect to the operation unit 70. When the system control unit 50 determines that the ending operation has been performed, processing of the present flowchart is ended, and when the system control unit 50 determines otherwise, processing returns to step S801.

As described above, according to the foregoing embodiments, when the user has performed shooting while the video camera is oriented vertically, the visibility of items displayed on the display unit can be maintained while keeping the size of a camera image. Also, as display items need not be displayed in a small region, display items can be displayed with a small interval from one another. In this way, the visibility of each display item is improved, and furthermore, when a touch operation is performed with respect to a display item, the possibility of touching an unintended display item can be reduced; as a result, usability is improved as well. Note that although the foregoing has described the video camera as an example, the present invention is also applicable to, for example, a single-lens reflex camera and a smartphone. Furthermore, the arrangement layout of items, the number and the types of items, and the like are not limited to the foregoing.

Note that various types of control that have been described above as being performed by the system control unit 50 may be performed by one item of hardware, and the entire apparatus may be controlled by a plurality of items of hardware sharing processing.

Furthermore, although the present invention has been described in detail based on preferred embodiments thereof, the present invention is not limited to these specific embodiments, and the present invention also includes various modes that do not depart from the principles of the present invention. In addition, each of the above-described embodiments merely represents one embodiment of the present invention, and the embodiments can also be combined as appropriate.

Moreover, although the embodiments have been described above using an exemplary case where the present invention is applied to the digital video camera, the present invention is not limited to this example and is applicable to an apparatus with a display control function. That is to say, the present invention is applicable to a personal computer, a PDA, a mobile telephone terminal, a mobile image viewer, a display-equipped printer apparatus, a digital photo frame, a game device, an electronic book reader, a tablet terminal, a smartphone, a projection apparatus, a display-equipped home appliance apparatus or vehicle-mounted apparatus, and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the fractions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-016495, filed Feb. 3, 2020, which is hereby incorporated by reference herein in its entirety.

What is claimed is:

1. A display control apparatus comprising:
at least one processor or circuit configured to function as:
an obtainment unit capable of obtaining a captured image, and
a control unit that performs control to display the captured image on a display device,
wherein
the control unit performs control to,
when the orientation of the display device is horizontal, display the captured image in a first size on the display device,
display a first item in a first region located along a first side of the display device, and
display a second item in a second region located along a second side of the display device, and
when the orientation of the display device is vertical, display the captured image in the first size on the display device, and
display the first item and the second item nearer to each other than when the orientation of the display device is horizontal,
wherein in a first display mode, the first and second items are superimposed on the captured image,
wherein the first side is an upper side in a case where the display device is oriented horizontally, the second side is a lower side in a case where the display device is oriented horizontally, and
wherein the control unit controls to, when the orientation of the display device is vertical, display the first item and the second item in one of a third region and a fourth region, the third region being a region located along a third side that is an upper side in a case where the display device is oriented vertically or a region located in the vicinity of the third side, the fourth region being a region located along a fourth side that is a lower side in a case where the display device is oriented vertically or a region located in the vicinity of the fourth side.

2. The display control apparatus according to claim 1, wherein the control unit performs control to display the first item and the second item in the same region when the orientation of the display device is vertical.

3. The display control apparatus according to claim 1 further comprising
a switching device that switches display positions of the items,
wherein under an instruction from the switching device, the control unit switches between a state where the first item and the second item are displayed in the third region and a state where the first item and the second item are displayed in the fourth region.

4. The display control apparatus according to claim 3, wherein the switching device is an operation member operated by a user.

5. The display control apparatus according to claim 1, wherein the first item and the second item are items of the same type.

6. The display control apparatus according to claim 5, wherein the same type is information related to exposure, information related to time measurement, information related to media, or information which is included in information displayed on the display device and which can be directly controlled.

7. The display control apparatus in accordance with claim 1, wherein in a second display mode, the first and second items are located outside of the captured image.

8. The display control apparatus in accordance with claim 7, wherein in the second display mode, when the orientation of the display device is vertical, the captured image is displayed in a different position on the display device than when the orientation of the display device is horizontal.

9. A display control apparatus comprising:
at least one processor or circuit configured to function as:
an obtainment unit capable of obtaining a captured image, and
a control unit that performs control to display the captured image on a display device,
wherein
the control unit performs control to,
when the orientation of the display device is horizontal, display a first item and a second item on the display device in a region surrounding the captured image, in such a manner that the captured image is placed between the first item and the second item, and
when the orientation of the display device is vertical, display the first item and the second item on the display device in a region which does not surround the captured image and which is different from the captured image, in such a manner that the first item and the second item neighbor each other.

10. The display control apparatus according to claim 9, wherein the control unit performs control to, when the orientation of the display device is horizontal, display the captured image in a first size on the display device, and when the orientation of the display device is vertical, display the captured image in a second size larger than the first size on the display device.

11. The display control apparatus according to claim 9, wherein the region which does not surround the captured image is an upper section or a lower section of the display device in a case where the orientation of the display device is vertical.

12. The display control apparatus according to claim 9, wherein the region which does not surround the captured image is a left section or a right section of the display device in a case where the orientation of the display device is vertical.

13. The display control apparatus according to claim 9, further comprising:
a switching device that switches display positions of the items,
wherein under an instruction from the switching device, the control unit switches the region which does not surround the captured image and in which the first item and the second item are displayed.

14. The display control apparatus according to claim 13, wherein the switching device is an operation member operated by a user.

15. The display control apparatus according to claim 9, wherein an amount of information displayed in the region which surrounds the captured image when the orientation of the display device is horizontal is equal to an amount of information displayed in the region which surrounds the captured image when the orientation of the display device is vertical.

16. The display control apparatus according to claim 9, wherein items displayed in the region which does not surround the captured image are items of the same type.

17. The display control apparatus according to claim 16, wherein the same type is information related to exposure, information related to time measurement, information related to media, or information which is included in information displayed on the display device and which can be directly controlled.

18. The display control apparatus in accordance with claim 9, wherein when the orientation of the display device is horizontal, the captured image is displayed at a first position on the display device, and when the orientation of the display device is vertical, the captured image is shifted to a second position on the display device different from the first position.

19. The display control apparatus in accordance with claim 18, wherein when the orientation of the display device is vertical, the captured image is shifted to the second position on the display device in at least one of a vertical direction and a horizontal direction.

20. A method of controlling a display control apparatus comprising:
obtaining a captured image;
controlling the captured image to be displayed on a display device; and
detecting an orientation of the display device,
wherein
in the controlling, control is performed to,
when the orientation of the display device detected in the detecting is horizontal, display the captured image in a first size on the display device,
further display a first item in a first region located along a first side of the display device, and
display a second item in a second region located along a second side of the display device, and
when the orientation of the display device is vertical, display the captured image in the first size on the display device, and
further display the first item and the second item nearer to each other than when the orientation of the display device is horizontal,
wherein in a first display mode, the first and second items are superimposed on the captured image, wherein the first side is an upper side in a case where the display device is oriented horizontally, the second side is a lower side in a case where the display device is oriented horizontally, and wherein in the controlling, control is performed to, when the orientation of the display device is vertical, display the first item and the second item in one of a third region and a fourth region, the third region being a region located along a third side that is an upper side in a case where the display device is oriented vertically or a region located in the vicinity of the third side, the fourth region being a region located along a fourth side that is a lower side in a case where the display device is oriented vertically or a region located in the vicinity of the fourth side.

21. A method of controlling a display control apparatus comprising:

obtaining a captured image;

controlling the captured image to be displayed on a display device; and detecting an orientation of the display device, wherein in the controlling, control is performed to, when the orientation of the display device detected in the detecting is horizontal, display a first item and a second item on the display device in a region surrounding the captured image, in such a manner that the captured image is placed between the first item and the second item, and when the orientation of the display device detected in the detecting is vertical, display the first item and the second item on the display device in a region which does not surround the captured image and which is different from the captured image, in such a manner that the first item and the second item neighbor each other.

22. A non-transitory computer-readable storage medium storing a program for causing a computer to execute a method of controlling a display control apparatus, the method comprising:

obtaining a captured image;

controlling the captured image to be displayed on a display device; and detecting an orientation of the display device, wherein in the controlling, control is performed to, when the orientation of the display device detected in the detecting is horizontal, display the captured image in a first size on the display device, further display a first item in a first region located along a first side of the display device, and display a second item in a second region located along a second side of the display device, and when the orientation of the display device is vertical, display the captured image in the first size on the display device, and further display the first item and the second item nearer to each other than when the orientation of the display device is horizontal, wherein in a first display mode, the first and second items are superimposed on the captured image, wherein the first side is an upper side in a case where the display device is oriented horizontally, the second side is a lower side in a case where the display device is oriented horizontally, and wherein in the controlling, control is performed to, when the orientation of the display device is vertical, display the first item and the second item in one of a third region and a fourth region, the third region being a region located along a third side that is an upper side in a case where the display device is oriented vertically or a region located in the vicinity of the third side, the fourth region being a region located along a fourth side that is a lower side in a case where the display device is oriented vertically or a region located in the vicinity of the fourth side.

23. A non-transitory computer-readable storage medium storing a program for causing a computer to execute a method of controlling a display control apparatus, the method comprising:

obtaining a captured image;

controlling the captured image to be displayed on a display device; and detecting an orientation of the display device, wherein in the controlling, control is performed to, when the orientation of the display device detected in the detecting is horizontal, display a first item and a second item on the display device in a region surrounding the captured image, in such a manner that the captured image is placed between the first item and the second item, and when the orientation of the display device detected in the detecting is vertical, display the first item and the second item on the display device in a region which does not surround the captured image and which is different from the captured image, in such a manner that the first item and the second item neighbor each other.

* * * * *